Patented Feb. 2, 1932

1,843,526

UNITED STATES PATENT OFFICE

STANLEY TUCKER, OF LONDON, ENGLAND, ASSIGNOR TO MINERALS SEPARATION NORTH AMERICAN CORPORATION, OF NEW YORK, N. Y., A CORPORATION OF MARYLAND

CONCENTRATION OF METALS

No Drawing. Application filed May 10, 1929, Serial No. 362,125, and in Great Britain September 7, 1928.

This invention relates to concentration of metals and is herein illustrated as applied to the concentration of copper in reduced or metallic form obtained in the treatment of Belgian Congo ores and of copper in the form of native copper.

The Belgian Congo and other African copper ores, as well as other copper ores, contain large amounts of the copper in what is known as an oxidized form such as carbonate. These have been treated to reduce the copper by heat treatment of the ore, one form of this treatment being described in British Patent No. 255,961. The reduced or metallic copper obtained by that and similar procedures has not been found satisfactorily amenable to concentration by any of the usual procedures, and the same is true of some of the native copper in some of the ores found elsewhere. According to the present invention, these and other difficulties are overcome or avoided by concentrating the copper by flotation procedures in the presence of a cyanide which, under properly controlled conditions, has the unusual effect of increasing the recovery of copper and of increasing the grade of the concentrate.

The procedures often are most effective when the reagents include not only the cyanide but also such a flotation agent as a xanthate, and most of the examples given below include the use of a xanthate, although one of the examples shows that the procedure is useful even in the absence of a xanthate or other material having an analogous effect on the procedures.

*Example I.*—A copper ore assaying 6.5% copper was ground to pass a 10 mesh screen. It was then heated to 650°–700° C. in the presence of 0.5% common salt and 2% powdered wood charcoal in a rotating tubular furnace. The copper was then found to be in the form of the metal and segregated from the particles that originally contained it, but on attempting to recover this copper by flotation an unsatisfactory grade of concentrate was obtained and the recovery of the copper was incomplete, amounting to only some 69%. Upon agitating a pulp of the fine treated ore with 3 pounds of blast furnace creosote, 0.2 pounds of potassium xanthate, 0.5 pounds sodium cyanide, all per ton of ore treated, a recovery of 94.5% of the copper was obtained in concentrates assaying 48.7% copper.

*Example II.*—An ore from the Belgian Congo containing 8.56% copper in the form of carbonate and silicate, with a gangue consisting mainly of calcite and dolomite, was ground to pass a screen of 30 meshes to the inch and then heated to 650° C. with 1% sodium chloride and 3% wood charcoal in a rotating tubular furnace. No segregation of the copper could be discovered,—the presence of the calcite and dolomite apparently having interfered with the segregation. This product was ground wet to pass a screen of 80 meshes per inch in a pebble mill in the presence of 2 pounds of sodium silicate, 0.5 pounds of sodium cyanide, 0.5 pounds of steam distilled pine oil, and 0.5 pounds fuel oil, all per ton of material treated. The ground ore in the form of a pulp was then agitated in a subaeration flotation machine with the addition of 0.1 pound of xanthate per ton of material treated, and a froth recovered during four minutes. There was then added 0.3 pounds of steam distilled pine oil and 0.3 pounds of fuel oil, both per ton of material treated. The pulp was agitated for one minute and a xanthate added at the rate of 0.1 pound per ton of material treated, and a second froth recovered during four minutes. The two froths combined contained 90.5% of the total copper in the crude ore and assayed 34.4% of copper. The copper was recovered in the form of metallic copper.

*Example III.*—An ore containing 3.35% copper, in the form of carbonate and silicate, was ground to pass a 10-mesh screen and then reduced by heat in a rotating tubular retort at 350° C. for twenty minutes, as described in British Patent No. 185,242. This product was wet ground in a pebble mill charged with coal gas to prevent oxidation of the metallic copper. To the mill there was added: 1 lb. of blast furnace creosite oil, ½ lb. kerosene oil, ½ lb. potassium cyanide, 1 lb. of sodium silicate, all per ton of ore. The ground ore in the form of a pulp was then agitated in a subaeration flotation machine with the further quantity of ½ lb. of potassium cyanide and 1/10 lb. of potassium xanthate, both per ton of ore. A froth concentrate was formed, carrying 89.7% of the copper. This concentrate assayed 35.3% of copper, and weighed 8.5% of the weight of the original ore. In the absence of the cyanide no effective extraction of copper was obtained.

Parallel tests using various quantities of potassium cyanide upon ore treated as described in the last-mentioned example showed that in one case the employment of ½ lb. per ton of potassium cyanide gave no result, possibly owing to the presence in the ore of some material which reacted with the cyanide. In this case the employment of 6 lbs. of potassium cyanide per ton of ore sufficed to obtain satisfactory extraction in the froth-flotation operation.

In another case, with a different ore heat-treated in the same way, ½ lb. of potassium cyanide per ton of ore gave excellent results. Good results were still obtained when the quantity of cyanide was increased to as much as 20 lbs. per ton of ore, showing that in this case a wide range of quantities was permissible. The minimum quantity which will give satisfactory results in any particular case is best determined by a preliminary trial. The addition of the cyanide to the grinding mill prior to flotation seems to be desirable.

*Example IV.*—Calumet & Hecla regrinding plant table middlings of 48 mesh, an ore carrying mainly native copper, were made into a pulp and agitated with 2.4 pounds of Barrett No. 35 oil, 1.4 pounds hardwood creosote, 0.32 pounds pine oil and 0.5 pounds potassium cyanide; the crude material assayed about 6% copper, and a concentrate was obtained containing 41.8% of copper representing a recovery of 96.7%.

*Example V.*—A pulp of the same material was agitated with 1.6 pounds xylidine and 0.5 pounds potassium cyanide, yielding a concentrate containing 30.2% copper with a recovery of 96.6%. In the absence of the cyanide the xylidine yielded substantially no concentrate.

Having thus described embodiments of my invention, what I claim is:

1. The process of concentrating material normally resistant to flotation and carrying metallic copper which consists in agitating it with a mineral-frothing agent and with a cyanide to form a float supported by bubbles, and separating the float.

2. The process of concentrating material normally resistant to flotation and carrying metallic copper, which consists in agitating it with a mineral-frothing agent and with a cyanide and xanthate to form a float supported by bubbles, and separating the float.

3. The process of obtaining copper from an oxidized copper ore which consists in reducing the ore to a material normally resistant to flotation and carrying copper in metallic form, making the material into a pulp and agitating with the addition of a frothing agent and a cyanide to form a float supported by bubbles and carrying metallic copper, and separating the float.

4. The process of obtaining copper from an oxidized copper ore which consists in reducing the ore to a material normally resistant to flotation and carrying copper in metallic form, making the material into a pulp and agitating with the addition of a frothing agent and a cyanide and a xanthate to form a float supported by bubbles and carrying metallic copper, and separating the float.

5. The process of obtaining copper from an oxidized copper ore which consists in heating the ground ore with a reducing agent so as to reduce copper in the treated ore to metallic form and produce a material normally resistant to flotation procedure, making the treated ore into a pulp, agitating the pulp with the addition of a frothing agent and a cyanide to form a float supported by bubbles and carrying metallic copper, and separating the float.

In testimony whereof, I have affixed my signature to this specification.

STANLEY TUCKER.